United States Patent Office 3,115,949
Patented Dec. 31, 1963

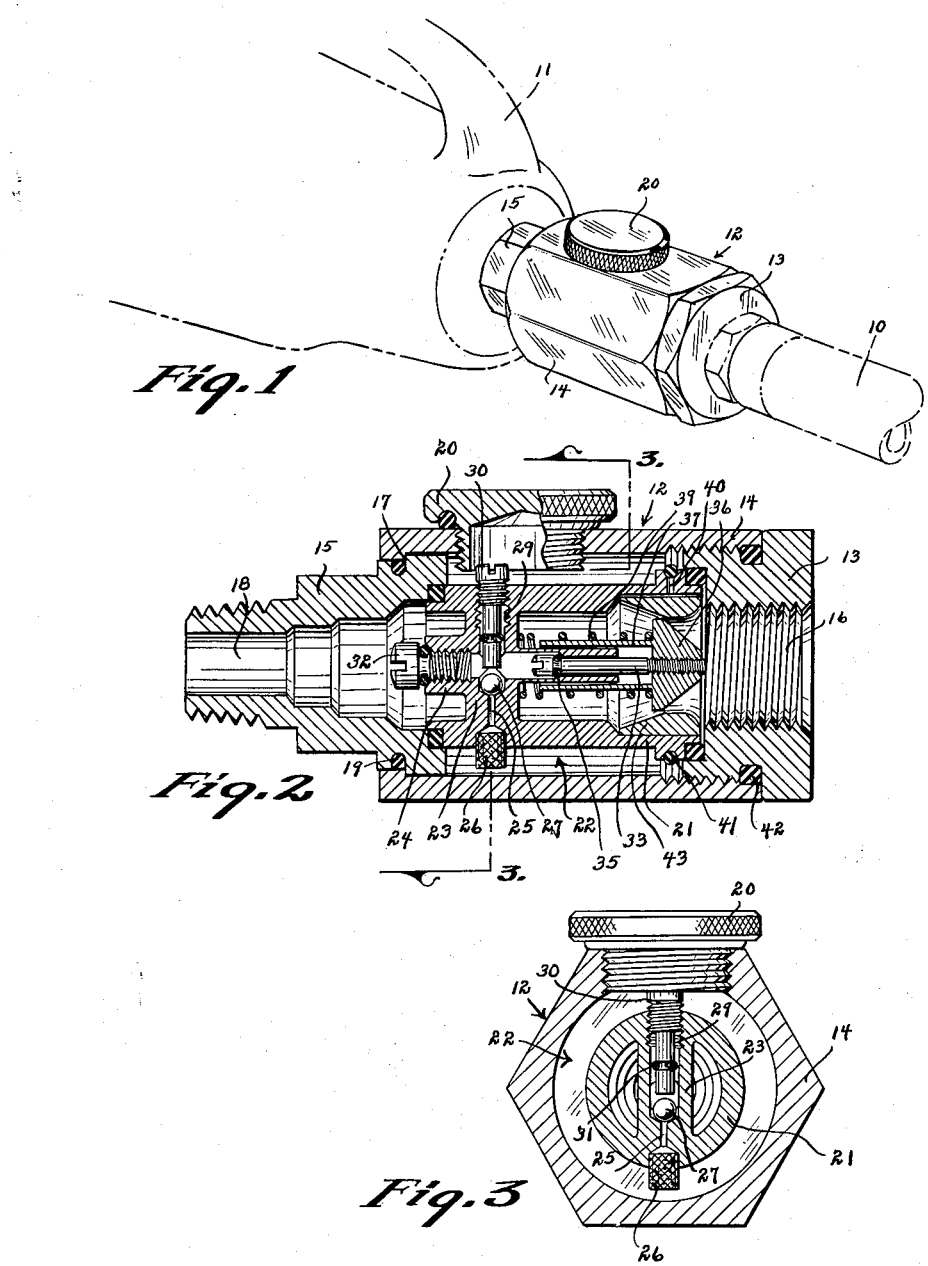

3,115,949
ADJUSTABLE AUTOMATIC OILER FOR
AIR CONDUITS
Jerry P. Malec, Omaha, Nebr., assignor to Comet Industries, Omaha, Nebr., a corporation of Nebraska
Filed Dec. 1, 1961, Ser. No. 156,329
10 Claims. (Cl. 184—55)

This invention relates to an automatic oil means for use in air lines and more particularly to an air conduit oiler for furnishing small amounts of lubrication to pneumatic tools and like.

The use of a source of air under pressure to actuate pneumatic tools, equipment and like, is now universally employed. The advantages are that the air power means is of light weight, fire hazard is eliminated, and noise level is reduced to a minimum. However, it is most difficult to oil or keep oiled the tools, equipment or like, that are being actuated by the air force. Attempts have been made to introduce oil directly into the air stream thus automatically lubricating the moving parts of the tools or equipment. Such devices, however, usually either seriously drop the air pressure at point of use, produce too much back pressure, or only operate intermittently when the air pressure flow is affected by the intermittent use of the air flow. In the first instance much efficiency is lost and in the latter instance some equipment would get too much oil, while other equipment using a substantially constant air stream would get little, if any, oil. Also, some tools, such as staplers, using only minimum air power would never be properly lubricated. While some of these problems were solved by the teachings of my Patent No. 2,984,316, issued May 16, 1961, on an Adjustable Automatic Oiler Means for Air Conduits, the device was rather bulky and complicated.

Therefore, one of the principal objects of my invention is to provide a simplified, lightweight and inexpensive air line oiler that functions continuously during the passage of the air stream to which it is associated.

A further object of this invention is to provide an air conduit oiler that does not materially reduce the air pressure stream passing from it.

A still further object of this invention is to provide an automatic oiler for an air pressure stream that introduces oil into the air stream without the air passing through the oil compartment.

A still further object of my invention is to provide a lightweight oiler for air lines that may be imposed in the line adjacent to the tool or equipment being used, or even within the tool itself.

Still further objects of my invention are to provide an air line oiler that is capable of adjustment to compensate for various grades of oil, various air pressures, and various air volume usage.

Still further objects of this invention are to provide an air line oiler that is economical in manufacture, durable in use, and refined in appearance.

These and other objects will be apparent to those skilled in the art.

My invention consists in the construction, arrangements, and combination, of the various parts of the device, whereby the objects contemplated are attained as hereinafter more fully set forth, specifically pointed out in my claims, and illustrated in the accompanying drawings, in which:

FIG. 1 is a perspective view of my oiler in one system of its use;

FIG. 2 is an enlarged longitudinal sectional view of the oiler and more fully illustrates its construction; and FIG. 3 is a cross-sectional view of my device taken on line 3—3 of FIG. 2.

In these drawings I have used the numeral 10 to designate an air pressure conduit adapted to be in communication with a source of air under pressure. Secured to the exit end of the conduit is a pneumatic tool 11. My oiling means is imposed in the conduit and to the rear of the tool 11. The oiler is so light of weight it may be a part of the end of the conduit and connected directly to the tool as shown in FIG. 1, or if desired, the oiler may be incorporated as a part of and within the tool. The numeral 12 generally designates the barrel housing of the oiler and which consists of three parts, 13, 14 and 15. The part 13 is the rear end cap portion having a large passageway 16 and into which the conduit 10 is detachably threaded. The part 15 has its rear end detachably extending into the forward end of the part 14 and has a substantial passageway 18 as shown in FIG. 2. The part 14 is in the form of a cylinder. The part 15 is first slid into the cylinder 14 from the rear and has a shoulder 17 engaging a shoulder in the forward end portion of the part 14. An O-ring 19 seals the parts 15 and 14. The part 13 threads into the rear end of the part 14. The numeral 20 designates a cap detachably threaded into an oil filling opening extending through the part 14. The numeral 21 generally designates the cylindrical core detachably within the cylinder 14 and having an outside diameter less than the inside diameter of the part 14, to provide an oil reservoir 22 surrounding the core 21. The numeral 23 designates a spoke webbing in and integral with the forward end portion of the core 21. A tubular stem conduit 24 extends through the webbing 23 and longitudinally of the center of the core 21 as shown in FIG. 2. Through the lower portion of the spoke webbing is an oil passageway 25. The lower outer end of the passageway 25 has a filter or screen means 26. The upper end of the passageway 25 is in the form of a valve seat and contains the ball valve 27. Through the upper portion of the spoke webbing is a passageway 29. Threaded in the passageway 29 is an oil adjusting screw 30 having a peripheral oil seal O-ring 31. The head of this screw 30 is under the cap 20, and by rotatably adjusting it, the ball valve will be accordingly adjusted as to its permissible upward movement away from its valve seat. By this arrangement of parts, the amount of oil entering the conduit tube 24 may be adjustably regulated. The numeral 32 designates a cap screw threaded into the forward end of the tubular conduit 24. The rear end portion of the tube conduit 24 is reduced in internal diameter. Slidably mounted in the tube conduit and having its rear end extending rearwardly from the tube conduit 24 is a headed screw 33 to create a valve between conduit 24 and the head of screw 33. An O-ring 35 embraces the screw 33 just back of its head for seating onto the reduced diameter of the tube conduit 24. The numeral 36 designates a cone-shaped head threaded onto the rear end of the screw 33 and having its pointed end extending rearwardly. This head 36 has a forwardly extending cylinder 37 slidably embracing the rear end portion of the tubular conduit 24. The numeral 39 designates a coil spring embracing the cylinder 37, having one end engaging the forward side of the cone 36 and its other end engaging the rear side of the tubular webbing 23. This spring 39 yieldingly holds the cone head 36 rearwardly. The numeral 40 designates an air pressure equalizing passageway through the wall of the core 21 and which is partially restricted by the O-ring 41 which embraces the core at this location as shown in FIG. 2. The passageway 40 and O-ring 41 comprise an air pressure equalizing valve. The part 13 threads into the rear end of the part 14 and has a seal ring 42. Embracing the core head 36 and loosely resting in a seat in the rear end portion of the core 21 is a ring collar 43. The cross-sectional wall area of this ring is such that its forward interior end portion extends forwardly and outwardly. The cone head 36, and this embracing collar ring 43 produce a venturi action within the core and causes, by the resultant suction, oil to be drawn from the compartment 22, thence through the screen 26, thence through the passageway 25, thence under and past the ball check valve 27, and thence into the tubular cylinder 24. This action, however, is only in operation when the air under pressure is passing through the conduit 10, and through my unit. Obviously, when the air is passing into and through my unit it will move the cone head 36 forwardly against the action of the spring 39. The forward movement of the cone head pushes the stem screw 33 forwardly and moves its O-ring 35 out of seating with the tubular conduit 24. Oil in the tubular conduit 24 will then be permitted to pass past the head of the screw 33, past its O-ring 35, past the shaft portion of the screw 33, and into the cylinder 37. From the cylinder the oil will pass from around the outer side of the rear end portion of the tubular conduit and into the through air passageway of the core 21. The oil is permitted to pass from the forward end of the cylinder 37 because it only loosely embraces the rear end portion of the tubular conduit 24. With the oil passing into the inside of the core 21, it will be picked up by the air flow and carried to the tool or like 11.

Herebefore, with automatic oilers, the problem was that if a sufficient amount of oil was furnished, an insufficient amount of air resulted. If a sufficient amount of air was realized, then the amount of oil was not sufficient. With my construction it will be appreciated that both a sufficient amount of air and oil may be realized, inasmuch as the oiling means does not materially restrict or interfere with the passage of air through the unit. However, with the increase of the volume of air passing through the unit, the amount of oil used will increase in direct ratio thereto. The reason for this is that the greater the volume of air passing through the unit, the further the cone head 36 will be moved forwardly and the further the cone head 36 is moved forwardly, the greater distance the sealing O-ring 35 will be out of its seat with the restricted rear passageway portion of the tubular conduit 24. When no air is passing through the unit, the coil spring 39 will move the cone head 36 to the rear, bringing the O-ring 35 into sealing position. While the injecting of a lubricant into the oil stream is automatic and in ratio to the volume of air being used, the flow of oil may be adjustably regulated by the valve limiting screw 30. The passageway 40 and the embracing O-ring 41 prevent a minus pressure development within the oil reservoir 22 and therefore the pressure inside the core and inside the reservoir 22 will be substantially equalized. After the oil has been used from the reservoir 22 the cap 20 is removed and a new supply of oil is placed in the unit, after which the screw cap 20 is replaced. The core portion 21 is held in place by its forward end engaging the part 15 and its rear end is engaged and supported by the detachable threaded rear end cap part 13.

Besides the venturi section phase of the unit, the structure is also such that due to the check ball valve 27 an oil pumping action is present. Whenever air is stopped from flowing through the device the coil spring 39 will move the cone head 36 rapidly to the rear. And the O-ring 35 will sufficiently close the cylinder in which it operates to cause a minus pressure past the ball valve 27 thus sucking oil up into the cylinder portion 24 beyond the ball 27. With oil thus deposited within the cylinder portion 24, the next time air pressure moves the cone 36 forwardly, oil will pass around the O-ring 35 and into the air stream. This action, irrespective of the venturi action, is possible by the closing of the ball check valve 27 and thereby preventing the oil from passing back into the reservoir portion.

There are many advantages present in the construction of my lightweight oiler. It will operate in any position or attitude and regardless of such position and attitude, oil will not objectionably flow uncontrolled into the core unit nor will the oil return from inside the core to the reservoir. The device will work equally well on small bursts of air intermittently flowing through the unit or when a continuous flow of air is passed through the unit. There is no danger of a lubricant escaping uncontrolled into the air line upon changes in air line pressures or upon being disconnected from the air pressure source. My unit will automatically release a film of oil into the oil stream but only when air is passed through the unit. This is true regardless of the air line pressures or auxiliary vibrations. The amount of oil released will be proportionate to the air volume and the operation of the device will not be affected by varying temperatures nor viscosities of oil. The equalizing passageway 40 also, by being in communication with the compressed air stream, minimizes the collection of foreign matter such as moisture in the reservoir.

Some changes may be made in the construction and arrangement of my adjustable automatic oiler for air conduits without departing from the real spirit and purpose of my invention, and it is my intention to cover by my claims, any modified forms of structure or use of mechanical equivalents which may be reasonably included within their scope.

I claim:
1. In an oiling means for air stream, comprising, in combination,
   a cylindrical housing having an air inlet port in its rear end and an air outlet port in its forward end,
   a cylindrical core in said cylindrical housing having an outside diameter less than that of the inside diameter of said cylindrical housing for producing an oil reservoir therebetween,
   an air pressure equalizing valve means between the inside of said core and said reservoir,
   said core having its two ends open and communicating with the two ports, respectively, of said cylindrical housing,
   a spoke support in the forward end portion of said core,
   a tubular conduit on said spoke support extending in the longitudinal center of said core,
   an oil passageway in said spoke support and core communicating with the inside of said tubular conduit and said oil reservoir,
   a shaft slidable in the rear end portion of said tubular conduit,
   a cone-shaped head on the rear end of said shaft having its pointed end extending toward the inlet port of said housing,
   an arcuate ring mounted in said cylindrical core adjacent said inlet port and having at least a portion of its inner perimeter complementary in shape to a portion of the outer surface of said cone-shaped head,
   means for yieldingly holding said cone-shaped head and shaft in a rearward direction, and
   a valve means interconnecting said shaft and said tubular conduit capable of closing the rear end portion of said tubular conduit when said cone-shaped head and shaft are in a rear position of their sliding movement.

2. In an oiling means for air streams, comprising, in combination,
   a cylindrical housing having an air inlet port in its rear end and an air outlet port in its forward end,
   a cylindrical core in said cylindrical housing having an outside diameter less than that of the inside diameter of said cylindrical housing for producing an oil reservoir;

an air pressure equalizing valve means between the inside of said core and said reservoir,
said core having its two ends open and communicating with the two ports, respectively, of said cylindrical housing,
a spoke support in the forward end portion of said core,
a tubular conduit on said spoke support extending in the longitudinal center of said core,
an oil passageway in said spoke support and core communicating with the inside of said tubular conduit and said oil reservoir,
a shaft slidable in the rear end portion of said tubular conduit,
a cone-shaped head on the rear end of said shaft having its pointed end extending toward the inlet port of said housing,
an arcuate ring mounted in said cylindrical core adjacent said inlet port and having at least a portion of its inner perimeter complementary in shape to a portion of the outer surface of said cone-shaped head,
means for yieldingly holding said cone-shaped head and shaft in a rearward direction,
a valve means interconnecting said shaft and said tubular conduit capable of closing the rear end portion of said tubular conduit when said cone-shaped head and shaft are in a rear position of their sliding movement, and
a filter means imposed in said oil passageway.

3. In an oiling means for air streams, comprising, in combination,
a cylindrical housing having an air inlet port in its rear end and an air outlet port in its forward end,
a cylindrical core in said cylindrical housing having an outside diameter less than that of the inside diameter of said cylindrical housing for producing an oil reservoir;
an air pressure equalizing valve means between the inside of said core and said reservoir,
said core having its two ends open and communicating with the two ports, respectively, of said cylindrical housing,
a spoke support in the forward end portion of said core,
a tubular conduit on said spoke support extending in the longitudinal center of said core,
an oil passageway in said spoke support and core communicating with the inside of said tubular conduit and said oil reservoir,
A shaft slidable in the rear end portion of said tubular conduit,
a cone-shaped head on the rear end of said shaft having its pointed end extending toward the inlet port of said housing,
an arcuate ring mounted in said cylindrical core adjacent said inlet port and having at least a portion of its inner perimeter complementary in shape to a portion of the outer surface of said cone-shaped head,
means for yieldingly holding said cone-shaped head and shaft in a rearward direction,
a valve means interconnecting said shaft and said tubular conduit capable of closing the rear end portion of said tubular conduit when said cone-shaped head and shaft are in a rear position of their sliding movement, and
an adjustable valve means in said oil passageway.

4. In an oiling means for air streams, comprising, in combination,
a cylindrical housing having an air inlet port in its rear end and an air outlet port in its forward end,
a cylindrical core in said cylindrical housing having an outside diameter less than that of the inside diameter of said cylindrical housing for producing an oil reservoir;
an air pressure equalizing valve means between the inside of said core and said reservoir,
said core having its two ends open and communicating with the two ports, respectively, of said cylindrical housing,
a spoke support in the forward end portion of said core,
a tubular conduit on said spoke support extending in the longitudinal center of said core,
an oil passageway in said spoke support and core communicating with the inside of said tubular conduit and said oil reservoir,
a shaft slidable in the rear end portion of said tubular conduit,
a cone-shaped head on the rear end of said shaft having its pointed end extending toward the inlet port of said housing,
an arcuate ring mounted in said cylindrical core adjacent said inlet port and having at least a portion of its inner perimeter complementary in shape to a portion of the outer surface of said cone-shaped head,
means for yieldingly holding said cone-shaped head and shaft in a rearward direction,
a valve means interconnecting said shaft and said tubular conduit capable of closing the rear end portion of said tubular conduit when said cone-shaped head and shaft are in a rear position of their sliding movement, and
a detachable filling cap threaded through the wall of said cylindrical housing.

5. In an oiling means for air streams, comprising, in combination,
a cylindrical housing having an air inlet port in its rear end and an air outlet port in its forward end,
a cylindrical core in said cylindrical housing having an outside diameter less than that of the inside diameter of said cylindrical housing for producing an oil reservoir;
an air pressure equalizing valve means between the inside of said core and said reservoir,
said core having its two ends open and communicating with the two ports, respectively, of said cylindrical housing,
a spoke support in the forward end portion of said core,
a tubular conduit on said spoke support extending in the longitudinal center of said core,
an oil passageway in said spoke support and core communicating with the inside of said tubular conduit and said oil reservoir,
a shaft slidable in the rear end portion of said tubular conduit,
a cone-shaped head on the rear end of said shaft having its pointed end extending toward the inlet port of said housing,
an arcuate ring mounted in said cylindrical core adjacent said inlet port and having at least a portion of its inner perimeter complementary in shape to a portion of the outer surface of said cone-shaped head,
means for yieldingly holding said cone-shaped head and shaft in a rearward direction, and
a valve means interconnecting said shaft and said tubular conduit capable of closing the rear end portion of said tubular conduit when said cone-shaped head and shaft are in a rear position of their sliding movement,
said cylindrical housing consisting of a cylindrical portion, a detachable forward end portion, and a rear end portion detachably threaded to the cylindrical portion.

6. In an oiling means for air streams, comprising, in combination,
a cylindrical housing having an air inlet port in its rear end and an air outlet port in its forward end,
a cylindrical core in said cylindrical housing having an outside diameter less than that of the inside diameter of said cylindrical housing for producing an oil reservoir,
an air pressure equalizing valve means between the inside of said core and said reservoir, said core having its two ends open and communicating with the two ports, respectively, of said cylindrical housing,
a spoke support in the forward end portion of said core,
a tubular conduit on said spoke support extending in the longitudinal center of said core,
an oil passageway in said spoke support and core communicating with the inside of said tubular conduit and said oil reservoir,
a shaft slidable in the rear end portion of said tubular conduit,
a cone-shaped head on the rear end of said shaft having its pointed end extending toward the inlet port of said housing,
an arcuate ring mounted in said cylindrical core adjacent said inlet port and having at least a portion of its inner perimeter complementary in shape to a portion of the outer surface of said cone-shaped head,
means for yieldingly holding said cone-shaped head and shaft in a rearward direction,
a valve means interconnecting said shaft and said tubular conduit capable of closing the rear end portion of said tubular conduit when said cone-shaped head and shaft are in a rear position of their sliding movement, and
said arcuate ring in said core, embracing said cone-shaped head and having its inner forward wall portion extending forwardly and outwardly.

7. In an oiling means for air streams, comprising in combination,
a cylindrical housing having an air inlet port in its rear end and an air outlet port in its forward end,
a cylindrical core in said cylindrical housing an outside diameter less than that of the inside diameter of said cylindrical housing for producing an oil reservoir;
an air pressure equalizing valve means between the inside of said core and said reservoir,
said core having its two ends open and communicating with the two ports, respectively, of said cylindrical housing,
a spoke support in the forward end portion of said core,
a tubular conduit on said spoke support extending in the longitudinal center of said core,
an oil passageway in said spoke support and core communicating with the inside of said tubular conduit and said oil reservoir,
a shaft slidable in the rear end portion of said tubular conduit,
a cone-shaped head on the rear end of said shaft having its pointed end extending toward the inlet port of said housing,
an arcuate ring mounted in said cylindrical core adjacent said inlet port and having at least a portion of its inner perimeter complementary in shape to a portion of the outer surface of said cone-shaped head,
a forwardly extending cylindrical sleeve on the forward side of said cone-shaped head loosely slidably embracing the rear end portion of said tubular conduit, and
a coil spring embracing said cylindrical sleeve having one end engaging said cone-shaped head and its other end engaging said spoke support.

8. In an oiling means for air streams, comprising in combination,
a cylindrical housing having an air inlet port in its rear end and an air outlet port in its forward end,
a cylindrical core in said cylindrical housing having an outside diameter less than that of the inside diameter of said cylindrical housing for producing an oil reservoir;
an air pressure equalizing valve means between the inside of said core and said reservoir,
said core having its two ends open and communicating with the two ports, respectively, of said cylindrical housing,
a spoke support in the forward end portion of said core,
a tubular conduit on said spoke support extending in the longitudinal center of said core,
an oil passageway in said spoke support and core communicating with the inside of said tubular conduit and said oil reservoir,
a shaft slidable in the rear end portion of said tubular conduit,
a cone-shaped head on the rear end of said shaft having its pointed end extending toward the inlet port of said housing,
an arcuate ring mounted in said cylindrical core adjacent said inlet port and having at least a portion of its inner perimeter complementary in shape to a portion of the outer surface of said cone-shaped head,
a forwardly extending cylindrical sleeve on the forward side of said cone-shaped head loosely slidably embracing the rear end portion of said tubular conduit,
a coil spring embracing said cylindrical sleeve having one end engaging said cone-shaped head and its other end engaging said spoke support, and
a valve means interconnecting said shaft and said tubular conduit capable of closing the rear end portion of said tubular conduit when said cone-shaped head and shaft are in a rear position of their sliding movement.

9. In an oiling means for air streams, comprising in combination,
a cylindrical housing having an air inlet port in its rear end and an air outlet port in its forward end,
said cylindrical housing including an oil reservoir,
said housing having its two ends open and communicating with the two ports,
a spoke support in the forward end portion of said housing,
a tubular conduit on said spoke support extending in the longitudinal center of said housing,
an oil passageway in said spoke support communicating with the inside of said tubular conduit and said oil reservoir,
means within said housing for equalizing the air pressure of said reservoir with the air pressure around said tubular conduit,
a shaft slidable in the rear end portion of said tubular conduit,
a cone-shaped head on the rear end of said shaft having its pointed end extending toward the inlet port of said housing,
an arcuate ring mounted in said cylindrical housing adjacent said inlet port and having at least a portion of its inner perimeter complementary in shape to a portion of the outer surface of said cone-shaped head,
and means for yieldingly holding said cone-shaped head and shaft in a rearward direction.

10. In an oil means for air streams, comprising, in combination,
a housing having an air inlet port and an air outlet port,
said housing including an oil reservoir,
a spoke support in said housing,
a tubular conduit on said spoke support extending in the longitudinal center of said housing,
means within said housing for equalizing the air pressure of said reservoir with the air pressure around said tubular conduit,
an oil passageway in said spoke support communicating with the inside of said tubular conduit and said oil reservoir,
a shaft slidable in said tubular conduit,
a cone-shaped head on said shaft having its pointed end extending toward the inlet port of said housing,
an arcuate ring mounted in said housing adjacent said inlet port and having at least a portion of its inner perimeter complementary in shape to a portion of the outer surface of said cone-shaped head, and means for yieldingly holding said cone-shaped head and shaft in a direction towards said arcuate ring.

References Cited in the file of this patent

UNITED STATES PATENTS

| | | |
|---|---|---|
| 1,504,169 | Weckman | Aug. 5, 1924 |
| 1,757,084 | Hansen | May 6, 1930 |
| 2,945,560 | Malec | July 19, 1960 |